UNITED STATES PATENT OFFICE.

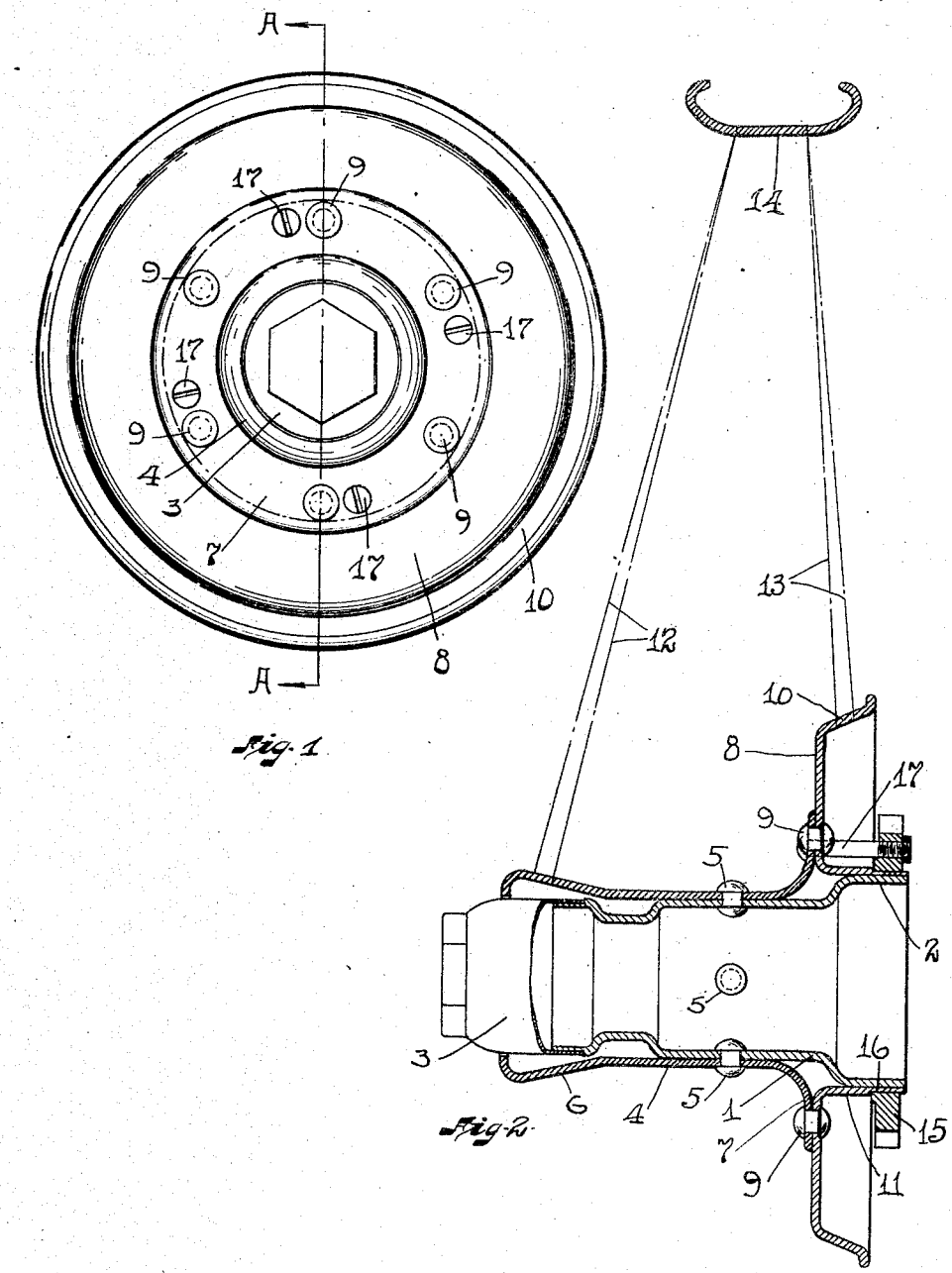

RICHARD S. BRYANT, OF CLEVELAND, OHIO, ASSIGNOR TO THE STANDARD WELDING COMPANY, OF CLEVELAND, OHIO, A CORPORATION OF OHIO.

HUB FOR VEHICLE-WHEELS.

1,176,030.  Specification of Letters Patent.  Patented Mar. 21, 1916.

Application filed August 22, 1914.  Serial No. 858,015.

*To all whom it may concern:*

Be it known that I, RICHARD S. BRYANT, a citizen of the United States, and a resident of Cleveland, county of Cuyahoga, and State of Ohio, have invented a new and useful Improvement in Hubs for Vehicle-Wheels, of which the following is a specification, the principle of the invention being herein explained and the best mode in which I have contemplated applying that principle, so as to distinguish it from other inventions.

The present invention relates to vehicle wheels, and particularly to hubs for wheels with wire spokes.

The object of the invention is the provision of a hub of which the parts may be economically manufactured and easily assembled to form a hub that will be very strong and rigid.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing, Figure 1 is an end elevation of a hub embodying the invention; and Fig. 2 is a sectional view on the line A—A of Fig. 1, with a rim shown in section and spokes shown in diagram.

The hub comprises a rolled tubular sleeve 1 which is intended to be suitably mounted on the front axle of an automobile with suitable bearings. At its inner end the sleeve is preferably provided with an enlarged cylindrical portion 2, and at its outer end it receives the usual dust cap 3.

A rolled cylindrical shell 4 is fitted on the sleeve 1 and is secured to the sleeve preferably by a peripheral series of rivets 5. At its outer end the shell is formed with an inclined surface 6 to properly receive the inner ends of a series of spokes 12. At its inner end the shell is formed with an outwardly extending flange 7.

A circular plate 8 is fitted against the inner side of the flange 7 and is secured thereto preferably by a series of rivets 9. At its outer periphery the plate 8 is formed with an inclined flange 10 to properly receive the inner ends of a series of spokes 13 which, with the spokes 12, are secured at their outer ends to a rim 14. At its inner periphery the plate 8 is provided with a flange 11 which bears against the enlarged cylindrical portion 2 of the sleeve 1.

An annular speedometer gear 15 is fitted on the flange 11 and against a shoulder 16 formed in the flange, and it is secured in place by a series of bolts 17 which extend through the flange 7, the plate 8, and the gear.

The several parts of the hub provided by the present invention may be rolled by economical operations and may be assembled and secured together readily and easily. The completed hub is a rigid structure admirably adapted for use in a wire spoke wheel, and it may be easily placed in position on its axle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A wheel hub, comprising a tubular sleeve; a cylindrical shell secured to the sleeve, the shell being formed at its inner end with an outwardly extending flange; and a circular plate secured to the flange of the shell, the plate being formed at its outer periphery with an inclined flange and at its inner periphery with a flange bearing against the sleeve.

2. A wheel hub, comprising a tubular sleeve; a cylindrical shell secured to the sleeve, the shell being formed near its outer end with an inclined surface and at its inner end with an outwardly extending flange; and a circular plate secured to the flange of the shell, the plate being formed at its outer periphery with an inclined flange and at its inner periphery with a flange bearing against the sleeve.

Signed by me, this 20th day of Aug., 1914.

RICHARD S. BRYANT.

Attested by—
VREMA WILLIAMS.
R. C. COOLEY.